(12) United States Patent
Knoppert et al.

(10) Patent No.: US 11,809,646 B1
(45) Date of Patent: Nov. 7, 2023

(54) SYSTEM AND METHOD FOR OBTAINING USER INPUT IN PORTABLE SYSTEMS

(71) Applicant: Dell Products L.P., Round Rock, TX (US)

(72) Inventors: Michiel Sebastiaan Emanuel Petrus Knoppert, Amsterdam (NL); Loo Shing Tan, Singapore (SG); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/181,120

(22) Filed: Mar. 9, 2023

(51) Int. Cl.
 *G06F 3/038* (2013.01)
 *G06F 3/14* (2006.01)
(52) U.S. Cl.
 CPC ............. *G06F 3/038* (2013.01); *G06F 3/14* (2013.01)
(58) Field of Classification Search
 None
 See application file for complete search history.

(56) References Cited

U.S. PATENT DOCUMENTS

| | | |
|---|---|---|
| 8,368,649 B2 | 2/2013 | Hall |
| 8,654,095 B1 | 2/2014 | Cho et al. |
| 10,719,145 B1 | 7/2020 | Files et al. |
| 2005/0083316 A1 | 4/2005 | Brian et al. |
| 2006/0205368 A1 | 9/2006 | Bustamante et al. |
| 2010/0053085 A1 | 3/2010 | Hall |
| 2013/0314338 A1 | 11/2013 | Nam et al. |
| 2015/0277598 A1 | 10/2015 | Aurongzeb et al. |
| 2016/0299606 A1* | 10/2016 | Go .................. G06F 3/04883 |
| 2016/0313819 A1* | 10/2016 | Ancona ............ G06F 3/04186 |
| 2019/0113966 A1* | 4/2019 | Connellan ............. G01S 5/16 |
| 2019/0187856 A1 | 6/2019 | Bruwer et al. |
| 2019/0339776 A1 | 11/2019 | Rosenberg et al. |
| 2020/0004346 A1 | 1/2020 | Vlasov et al. |
| 2020/0371625 A1 | 11/2020 | Katsurahira et al. |

* cited by examiner

*Primary Examiner* — Stephen T. Reed
(74) *Attorney, Agent, or Firm* — Womble Bond Dickinson (US) LLP (57) ABSTRACT

Methods and systems for providing computer implemented services using user input are disclosed. To obtain the user input, a passive human interface device may be used. The human interface device may include a magnet that may produce a magnetic field used to discern the user input. The magnet may be repositioned thereby facilitating both translation and rotation of the magnet responsive to actuations by a user. The translation and rotation of the magnet may be sensed by a sensing system and used to identify user input provided by the user. Sensing elements integrated into the sensing system may be used to obtain user input from the human interface device, the user input then being interpreted to provide the computer implemented services.

20 Claims, 7 Drawing Sheets

SYSTEM AND METHOD FOR OBTAINING USER INPUT IN PORTABLE SYSTEMS

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic fields detectable by a sensing system.

The sensing system may sense the magnetic fields and obtain information reflecting changes in the position and/or orientation of a magnet of the human interface device that generates the magnetic fields. Thus, information reflecting actuations of the human interface device by the user may be encoded in the magnetic fields and may be sensed.

The obtained information may then be used to identify, for example, user input provided by the user. Thus, the information regarding changes in the position and/or orientation of the magnet may be translated into user input. The user input may then be used to drive computer implemented services.

For example, the user input may be provided by the user to activate certain functionalities, change functionalities, terminate functionalities, and/or invoke desired activities by a data processing system.

To encode information regarding different types of actuations of human interface devices, the sensing system may include sensing elements positioned at static locations proximate to sensing areas of the sensing system. By doing so, the obtained information may indicate an absolute location (relative to the static locations) of the human interface device. The absolute location, and one or more actuations provided therein, may correspond with types of the user input associated with the absolute location.

For example, an actuation of the human interface device at a first absolute location may be associated with modifying audio settings of a data processing system. The manner in which the actuation is performed within the first absolute location may be used to determine how the audio settings are modified. Additionally, a second actuation of the human interface device at a second absolute location may be associated with modifying a display brightness of the data processing system. The manner in which the second actuation is performed within the second absolute location may be used to determine how the display brightness is modified.

Resulting changes in position of the magnet from an actuation of the human interface device may encode sufficient information in the magnetic field emanating from the human interface device to distinguish actuations of the human interface device from repositioning of the human interface device.

By using a magnet, the human interface device may not need to be powered, may include fewer components thereby reducing the likelihood of component failures, may be made lighter/smaller thereby reducing loads placed on user of user input devices, etc.

To sense the magnetic field, one or more sensing elements may be integrated into the sensing system. The sensing system may provide information regarding actuations of the human interface device as well as information regarding actuations of other human interface devices positioned with the sensing system.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining user input.

In an embodiment, a method for interpreting user input provided by a human interface device is provided.

The method may include identifying a presence of the human interface device; obtaining, based on the identified presence, sensor data from a sensing system that tracks a magnetic field emanating from the human interface device; performing pattern matching of the sensor data against a generalized set of sensor data patterns that are location dependent to obtain a type of the user input, the type of the user input corresponding with an operation performable by a data processing system; identifying the operation to be performed based on the type of the user input; and performing the operation.

Identifying the presence of the human interface device may include identifying a sensing element from which the sensor data is obtained; and identifying a sensing area associated with the sensing element.

The sensing area may include at least two zones, and each of the at least two zones may include respective portions of the sensing area.

Performing the pattern matching may include identifying, based on the sensor data, a zone of the at least two zones in which the human interface device is positioned; identifying a sub-set of the generalized set of sensor data patterns associated with the zone; discriminating one of the sensor data patterns of the sub-set of the generalized set of sensor data patterns based on the sensor data; and using the discriminated one of the sensor data patterns of the sub-set of the generalized set of sensor data patterns to obtain the type of the user input.

A first sensor data pattern of the generalized set of sensor data patterns may be associated with a first zone and a second zone, a first pair of the first sensor data pattern and the first zone may be associated with a first type of user input, and a second pair of the first sensor data pattern and the second zone may be associated with a second type of user input.

The sensing system may include a first sensing area including the first zone and the second zone; and a second sensing area separate from the first sensing area.

The sensing system may further include first sensing elements positioned with the first area to monitor human interface devices positioned proximate to the first area; and second sensing elements positioned with the second area to monitor human interface devices positioned proximate to the first area.

The sensing system may further include a structural feature that delineates the first zone from other zones in the first sensing area.

The structural feature may include a recess in a surface of the sensing system in the first sensing area.

The sensing system may further include a graphical display element positioned in the second sensing area, the graphical display element being positioned straddling across at least two zones of the second sensing area, and each of the at least two zones of the second sensing area being associated with different types of user input.

The graphical display element may include a video display adapted to operably connect to the data processing system that performs the operation.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Figure 1:
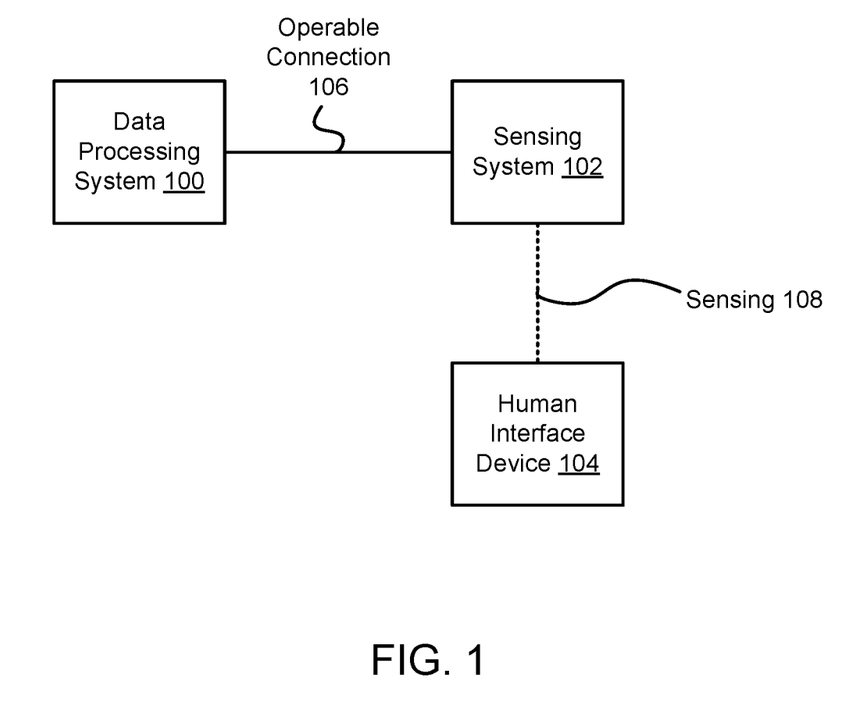
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions (and/or results of the actions) may be sensed by various devices, and the sensing may be interpreted (e.g., translated) to obtain the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

Additionally, the manner in which these actuations may be interpreted to obtain user input may be limited based on the diversity of the actions. For example, depression of a click of a mouse may be uniformly interpreted to convey a certain type of user input. Consequently, the variety of user input that may be conveyed through actuation may be limited based on how the structures may be actuated.

In general, embodiments disclosed herein may provide methods, systems, and/or devices for interpreting an actuation of a human interface device based on a location of the human interface device to obtain user input. The user input may be obtained using a sensing system integrated with a pad. The sensing system may define where the human interface device is positioned. By interpreting the actuation based on the position of the human interface device, the sensing system may allow a diverse interpretation of the actuation despite limited diversity in how the actuations may be performed. For example, when an actuation of the human interface device is performed at a first location, the actuation may be interpreted as user input that modifies a volume setting. When the actuation is performed at a second location, the actuation may be interpreted as different user input that modifies a brightness setting (e.g., display brightness, keyboard brightness, etc.). Consequently, limitations regarding how a limited set of actuations may be interpreted to obtain user input used to provide computer implemented services may be reduced.

To provide the computer implemented services, a system may include data processing system 100. Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104 and provide the signals and/or data to data processing system 100. A user may physically interact with human interface device 104, thereby allowing the signals and/or data provided by sensing system 102 to include information regarding the physical actions of the user. While described in FIG. 1 with respect to a single human interface device, it will be appreciated that sensing system 102 may track and provide information regarding any number of human interface devices without departing from embodiments disclosed herein.

For example, if a user moves human interface device 104, sensing system 102 may track the change in position and/or motion of human interface device 104 and provide signals and/or data reflecting the changes in position and/or motion. Similarly, if a user actuates an actuatable portion (e.g., buttons) of human interface device 104, sensing system 102 may track the actuation of the actuatable portion and provide signals and/or data reflecting the actuation.

To track human interface device 104, sensing system 102 may include one or more sensing elements (e.g., one or more sensors) that sense a magnetic field emanating from human interface device 104. The sensing elements may use the sensed magnetic field to track a location (e.g., an absolute location) and orientation of a magnet embedded in human interface device 104. The sensing elements may generate the signals and/or data provided by sensing system 102 to data processing system 100. The sensing elements may sense the magnitude and/or direction of the magnetic field that passes proximate to each sensing element. By knowing the placements of the sensing elements with respect to one another, the position and/or orientation of the magnet may be identified based on the sensed magnetic fields to which the sensing elements are exposed (e.g., the magnetic field may be treated as emanating from a magnet with known dimensions and/or strength, and/or other assumptions may be made to deduce the location and/or orientation of the magnet).

Sensing system 102 may also include, for example, analog to digital converters, digital signal processing devices or other signal processing devices (e.g., also referred to as a "signal processing chain"), and/or other devices for generating the signals and/or data based on information obtained via the sensing elements.

In an embodiment, sensing system 102 is integrated with another human interface device. Sensing system 102 may be implemented with a set of sensing elements that are integrated into a pad. The pad may be positioned with data processing system 100 in a manner that allows user input from multiple sources (e.g., any number of human interface devices positioned thereby) to be provided, from sensing system 102, to data processing system 100. Additionally, interpretation of the user input provided may be based on a zone (e.g., a range of positions) of the pad. For example, an actuation of one of the multiple sources within a first zone may be interpreted as a first type of the user input, while the actuation may be interpreted as second type of the user input when performed within a second zone.

Human interface device 104 may be implemented with a physical device that a user may actuate in one or more ways. For example, human interface device 104 may (i) be moveable, (ii) may include one or more buttons, (iii) may include one or more scroll controls, and/or (iv) may include other actuatable elements. Actuating human interface device 104 may change the orientation and/or position of the magnet with respect to the sensing elements of sensing system 102.

For example, when human interface device 104 is moved away from sensing system 102, the strength of the magnetic field emanating from the magnet as sensed by sensing elements of sensing system 102 may decrease. Similarly, when buttons or other actuatable elements of human interface device 104 are actuated, the magnet may be rotated (e.g., in one or more planes) thereby changing the direction of the magnetic field sensed by sensing elements of sensing system 102. Refer to FIGS. 2A-2E for additional details regarding sensing of human interface device 104.

Human interface device 104 may be implemented using a passive device. For example, human interface device 104 may not consume power, include batteries or sensors (or other components that may consume power during operation), etc. Rather, to convey information to sensing system 102, human interface device 104 may include a permanent magnet mechanically coupled to actuatable portions. Thus, information regarding actuation of human interface device 104 may be encoded in a static magnetic field produced by the permanent magnet and sensed by sensing system 102. Consequently, human interface device 104 may be of smaller size, lower weight, and/or may provide other advantages when compared to active devices such as a computer mouse. Refer to FIGS. 2B-2C for additional details regarding human interface device 104.

Data processing system 100 or sensing system 102 may perform pattern matching or other types of operations (e.g., performing a lookup) to translate the signals and/or data from sensing system 102 into user input. The translation may be based on a location, relative to sensing system 102, at which the signals and/or data indicate user input is provided. Once obtained, the user input may be used to drive downstream processes such as any type of computer implemented service.

Figure 3:
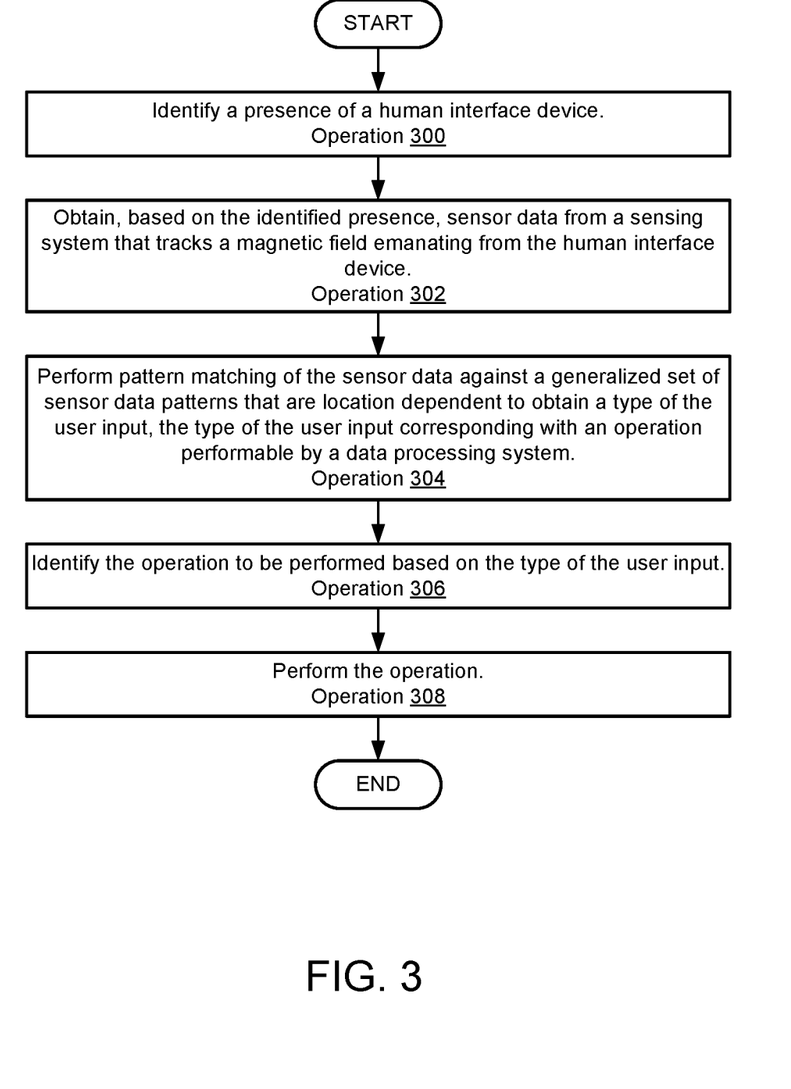
FIG. 3 shows a flow diagram illustrating a method for interpreting user input provided by a human interface device in accordance with an embodiment.

When providing its functionality, data processing system 100 and/or sensing system 102 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. Sensing system 102 may include a chipset or other component to implement and provide an interface to data processing system 100 via the wired and/or wireless connection. The interface of sensing system 102 may be integrated into, for example, a flat, pad-like structure.

As noted above, human interface device 104 may not be operably connected to other devices (e.g., may be a passive device), but may be sensed by sensing system 102 via sensing 108. For example, during sensing 108, a static magnetic field emanating from human interface device 104 may be sensed by sensing system 102 to obtain the user input.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of one or more human interface devices (e.g., 104) by sensing system 102 in accordance with an embodiment are shown in FIGS. 2A-2E.

Figure 2A:
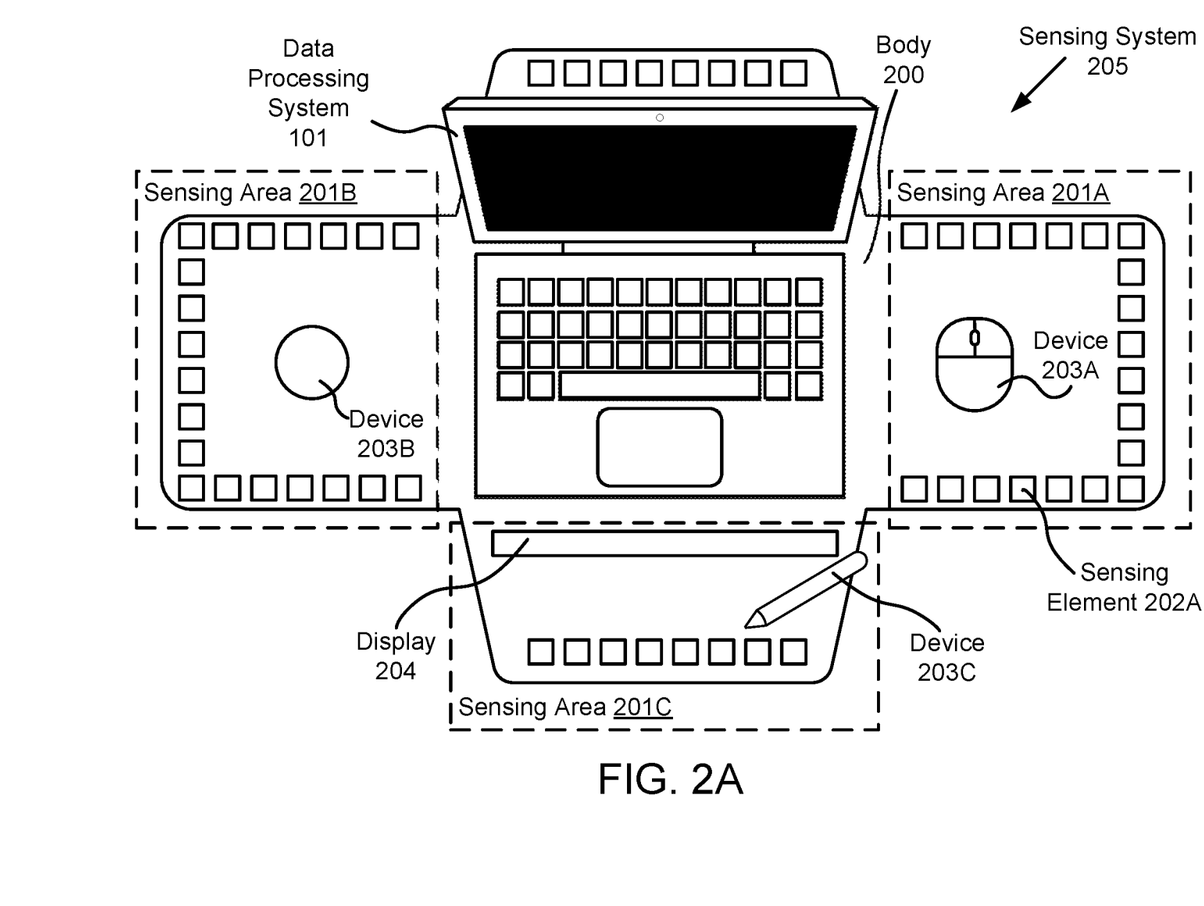
FIG. 2A shows a diagram illustrating a human interface device and a sensing system in accordance with an embodiment.
Figure 2B:
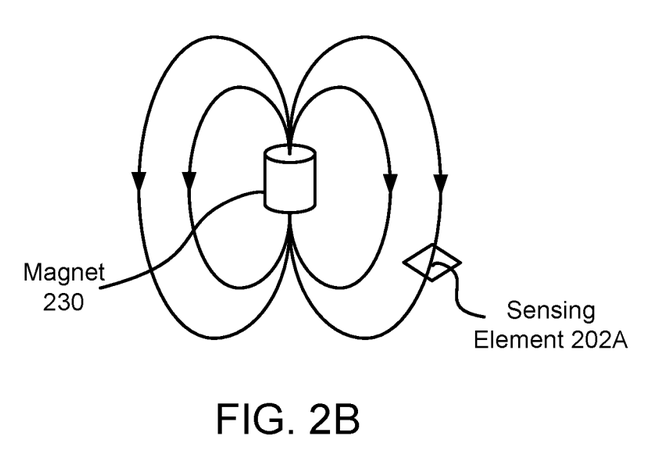
FIGS. 2B-2C show diagrams illustrating field sensing in accordance with an embodiment.
Figure 2C:
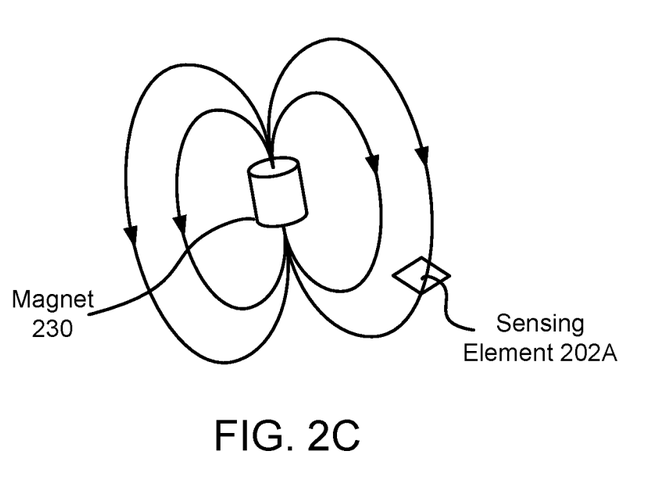

Turning to FIG. 2A, a diagram illustrating a human interface device and a sensing system (e.g., 205) in accordance with an embodiment is shown. As discussed above, sensing system 102 shown in FIG. 1 may be implemented using sensing elements (e.g., sensors) of sensing system 102 that are integrated with a flat, pad-like structure (e.g., body 200). Sensing system (e.g., 205) may be a structure integrated sensing system and may include functionality to obtain, interpret, and implement user input provided by one or more human interface devices (e.g., 104). To provide this functionality, sensing system 205 may be implemented with body 200. Body 200 may include any number of sensing elements (e.g., 202A-202C, 202B-202C illustrated and discussed with regard to FIGS. 2D-2E) for sensing actuation of human interface devices (e.g., 203A-203C) positioned nearby and/or within any number of sensing area(s) (e.g., 201A-201C). Each of these components are discussed below (Refer to FIG. 2E for information regarding display 204).

Body 200 may be implemented with a structure upon which other elements may be affixed, placed on, and/or positioned inside thereof. For example, data processing system 101 (an example implementation of data processing system 100) may be placed upon at least a portion of body 200.

Body 200 may include one or more sensing areas (e.g., 201A-201C). Each sensing area may be implemented using a flat plastic injection molded component or other structure. These sensing areas may be affixed to one another and may, for example, be capable of folding over one another (and/or over data processing system 101), allowing for efficient portability of sensing system 102. While unfolded, body 200 may provide a range of surface area in which human interface device(s) 203A-203C may be placed upon and/or near where device(s) 203A-203C are sensed by sensors (e.g., sensing element(s) 202A-202C) that are integrated with sensing area(s) 201A-201C. By doing so, two or more passive human interface devices (e.g., 203A-203C) may provide user input to sensing system 102. This user input may then be accurately interpreted as instructions for an associated operation to be performed by a data processing system (e.g., 101) operably connected to sensing system 102.

The interpretation of the user input may be based on one or more zones of the sensing areas. For additional information regarding the zones and the interpretation of the user input, refer to FIGS. 2D-2E, discussed further below.

Body 200 may also include an interior region in which various components may be positioned. These components may include (i) signal processing components coupled to the sensing elements to generate electrical signals corresponding to actuations of device(s) 203A-203C, (ii) signal aggregation components that allow the electrical signals to be stored and routed, (iii) communication components such as chipsets that allow the signals routed to the communication components to be transmitted to the data processing system (e.g., thereby establishing an interface to the data processing system through which information may be exchanged), and/or (v) other types of components for obtaining user input, generating signals corresponding to the user input, and providing the signals to other devices to which body 200 may be operably connected.

Device(s) 203A-203C may be passive human interface devices (e.g., human interface device 104) in which various actuations may cause one or more magnets of the passive human interfaces to be positioned and/or oriented in a manner that corresponds with user input. These passive human interface devices may be implemented with, for example, (i) a computer mouse (e.g., 203A), (ii) a radial dial (e.g., 203B), (iii) a computer stylus (e.g., 203C), and/or (iv) any other passive human interface devices capable of being sensed by sensing system 102, not to be limited by embodiments discussed herein. Refer to FIGS. 2B-2C for clarifying information regarding field sensing of the magnetic field emanating from the one or more magnets.

Sensing element 202A (and sensing elements 202B-202C, discussed further below) may be implemented with a sensor. The sensor may include functionality to measure an intensity and direction of a magnetic field to which sensing element 202A is exposed. Body 200 may include any number of sensing elements (e.g., 202A-202C).

Although not illustrated, the sensing elements may be organized into different arrays. Each of the arrays may include similar or different numbers and/or types of sensing elements (each array may be homogenous or heterogenous with respect to sensing element type, different types of sensing elements may have different capabilities such as a noise floor).

For example, the sensing elements may be arranged in three locations corresponding with a sensing area. A first sensing array may be positioned on a first side of the sensing area. A second sensing array may be positioned on a second side of the sensing area. A third sensing array may be positioned on a third side of the sensing area. The first side and the second side may be on opposite sides of the sensing area with the third side joining the first and second.

The sensing elements of each of the sensing arrays may be positioned inside of body 200, as previously mentioned. For example, the sensing arrays may be positioned in an interior of body 200. Thus, while not directly on each of the sides, the sensing arrays may be positioned close to the sides (e.g., separated by a thickness of body 200).

While illustrated in FIG. 2A as having specific shapes and sizes, it will be appreciated that the shapes and orientation of sensing elements (e.g., 202A-202C) are merely illustrative and the shapes may be different without departing from embodiments disclosed herein.

Figure 2D:
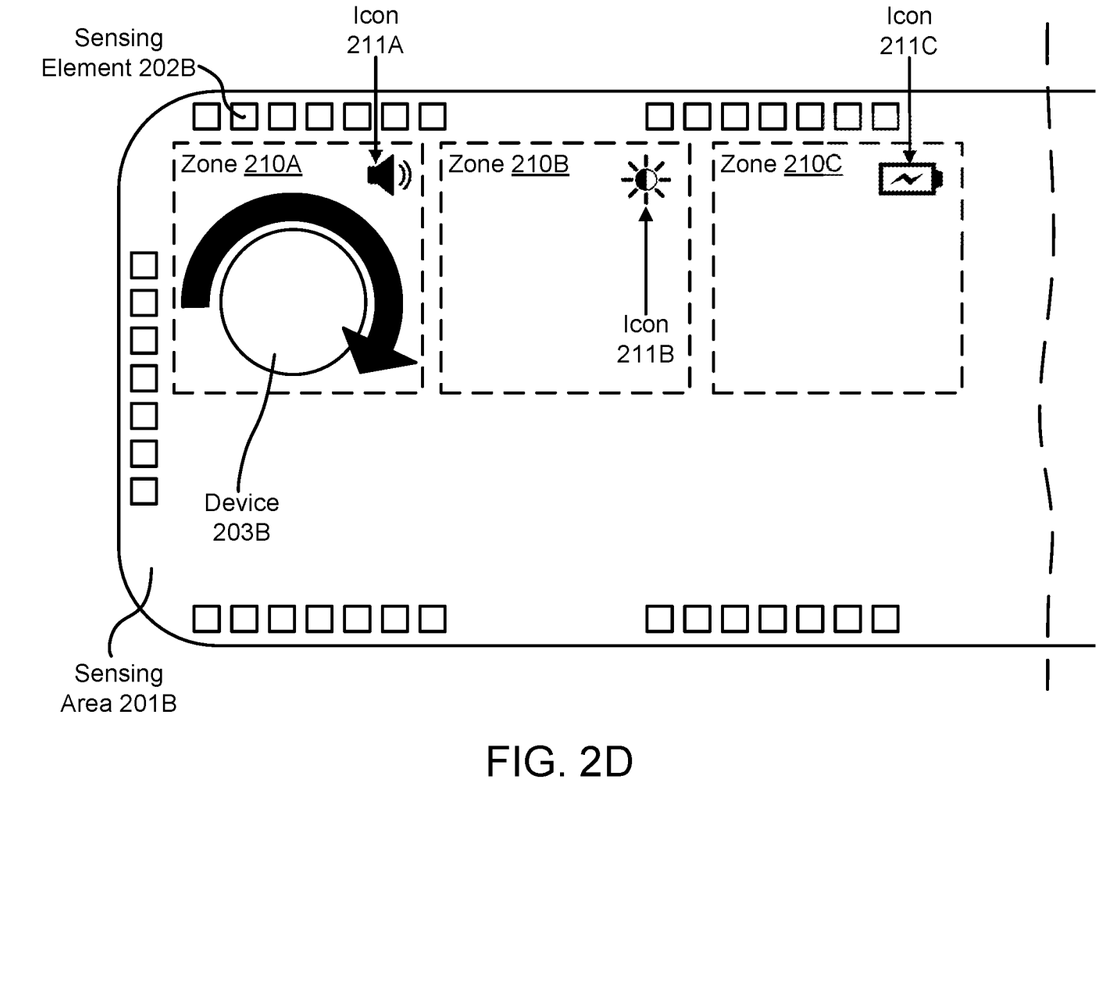
FIGS. 2D-2E show diagrams illustrating an example implementation of a sensing system in accordance with an embodiment.
Figure 2E:
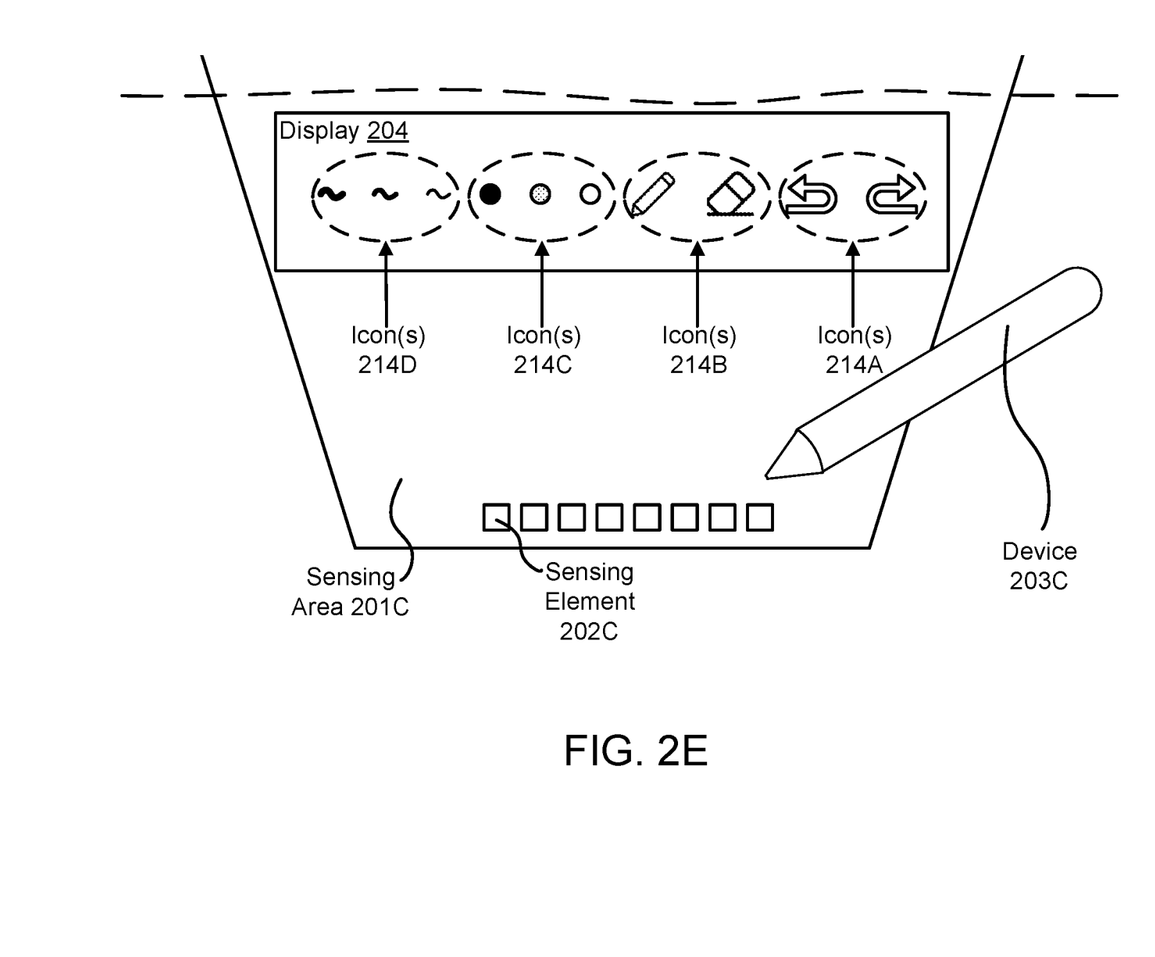

By positioning the sensing elements as discussed above, one or more human interface devices positioned by body 200 may allow a user to provide user input. The user input may be obtained by tracking of magnetic fields using the sensing elements. The tracked magnetic fields may be used to identify the user input. Refer to FIGS. 2D-2E for additional information regarding the example implementation of sensing system 102 described with respect to FIG. 2A.

Turning to FIGS. 2B-2C, diagrams illustrating a magnet (e.g., 230) and sensing element 202A in accordance with an embodiment are shown. As noted above, human interface device 104 (e.g., device 203A) may include magnet 230 (e.g., a permanent magnet). Magnet 230 may project a magnetic field. In these figures, the magnetic field is illustrated using lines with arrows superimposed over the midpoints of the lines. The direction of the arrow indicates and orientation of the field.

As seen in FIG. 2B, when magnet 230 is proximate (e.g., within a predetermined distance range, which may vary depending on the strength of magnet 230 and sensitivity level of sensing element 202A) to sensing element 202A, the magnetic field may be of sufficient strength to be measurable by sensing element 202A. Sensing element 202A may utilize any sensing technology to measure the magnitude and/or the orientation of the magnetic field at its location. Due to the magnetic field distribution of magnet 230, the magnitude and orientation of the magnetic field at the location of sensing element 202A may be usable to identify, in part, the location and orientation of magnet 230.

For example, when magnet 230 is rotated as shown in FIG. 2C from the orientation as shown in FIG. 2B, the direction and/or magnitude of the magnetic field at the location of sensing element 202A may change. By identify the magnitude and orientation of the magnetic field at a number of locations (e.g., corresponding to different sensing elements), the position and orientation of magnet 230 may be identified.

To utilize the location and orientation of the magnet embedded in human interface device 104 to obtain user input, magnet 230 may be mechanically coupled to the actuatable elements and/or body of the human interface device. By doing so, information regarding actuation of the human interface device by a user may be encoded into the magnetic field projected by magnet 230 and sensed by sensing element 202A.

Turning to FIGS. 2D-2E, diagrams illustrating sensing, by sensing system 102, of the magnetic field projected by a magnet of a human interface device in accordance with an embodiment are shown.

In FIG. 2D, a diagram of sensing area 201B (previously depicted with respect to the discussion of FIG. 2A) in accordance with an embodiment is shown. As discussed above, the interpretation of the user input may be based on one or more zones (e.g., zone(s) 210A-210C) of the sensing areas (e.g., sensing area 201B). Each of the one or more zones may be designated as an area in which a presence (e.g., as detected by sensing element 202B) of a human interface device is associated with a type of the user input. For example, device 203B may be placed within zone 210A. As indicated by icon 211A (an audio symbol), zone 210A may be associated with audio settings (e.g., volume), and thus actuation of device 203B (e.g., a clockwise rotation of the radial dial illustrated by the black arrow) may modify (e.g., increase) the volume of data processing system 101.

Similarly, zone 210B may be associated with a second type of the user input. For example, as indicated by icon 211B (a brightness symbol), zone 210B may be associated with display brightness settings of data processing system 101. Thus, actuation of device 203B (e.g., a clockwise rotation of the radial dial illustrated by the black arrow) within zone 210B may modify (e.g., increase) the brightness of data processing system 101.

Accordingly, zone 210C may be associated with a third type of the user input. For example, as indicated by icon 211C (a battery symbol), zone 210C may be associated with power saver/performance settings of data processing system 101. Thus, actuation of device 203B (e.g., a clockwise rotation of the radial dial illustrated by the black arrow) within zone 210C may modify (e.g., increase) the power efficiency of data processing system 101.

Turning to FIG. 2E, a diagram of sensing area 201C (previously depicted with respect to the discussion of FIG. 2A) in accordance with an embodiment is shown. As discussed above, the interpretation of the user input may be based on the one or more zones (e.g., display 204) of the sensing areas (e.g., sensing area 201C).

Display 204 may be implemented with a graphical display element positioned in sensing area 201C. Display 204 may be positioned straddling across at least two zones (not explicitly shown) of sensing area 201C, and each of the at least two zones of sensing area 201C being associated with different types of user input. For example, icon(s) 214A-214D may each straddle a respective zone that is associated with a respective type of the user input.

Thus, each of the at least two zones may be designated as an area in which a presence (e.g., as detected by sensing element 202C) of a human interface device is associated with a type of the user input. For example, device 203C may be placed (i) within display 204 and (ii) closest to icon(s) 214A (two white arrows pointing away from one another). Icon(s) 214A, and a first zone in which icon(s) 214A straddle across, may be associated with, for example, undo and redo operations corresponding with software hosted on data processing system 101. By being present in the first zone, actuations of device 203C may cause operations associated with icon(s) 214A to be executed based on the actuation in which an operation is initiated.

Accordingly, icon(s) 214B-214D may also be associated with special operations (e.g., specific operations executed using specific software hosted by the data processing system). For example, icon(s) 214B may be associated with a second zone, the second zone being associated with drawing tip types for a drawing application hosted by the data processing system. Icon(s) 214C may be associated with a third zone, the third zone being associated with colors of the drawing tip types for the drawing application. Icon(s) 214D may be associated with a fourth zone, the fourth zone being associated with a thickness of the drawing tip types for the drawing application.

Thus, the graphical display element may include, for example, a video display adapted to operably connect to the data processing system that performs the operation (e.g., by using a corresponding application hosted by the data processing system).

In FIGS. 2D-2E, magnetic fields projected by magnets positioned in device(s) 203B-203C, although not shown, are sensed by sensing elements (e.g., 202B-203C) of sensing area(s) 201B-201C. Additionally, the field orientation may be different from that shown in FIG. 2B-2C (e.g., the fields may be oriented into/out of the page rather than along the page).

Magnetic fields emanating from each of the human interface devices may be limited in extent. Consequently, only some of the sensing elements of each sensing array may be able to sense the respective fields. Further, by virtue of the relative placement of each of the sensing arrays, the respective sensing arrays may be substantially isolated, to an extent, from the magnetic fields emanating from other human interface devices.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method interpreting user input provided by a human interface device in accordance with an embodiment is shown. The method may be performed by data processing system 100, sensing system 102, human interface device 104, and/or other components of the system of FIG. 1.

At operation 300, a presence of a human interface device is identified. The presence of the human interface device may be identified by sensing a presence of a magnetic field produced by magnet(s) of the human interface device (refer back to the description of FIGS. 2B-2C for clarifying information regarding field sensing).

Based on the identified presence, at operation 302, sensor data is obtained from a sensing system that tracks the magnetic field emanating from the human interface device. The sensor data may be obtained (e.g., over time) by sensing properties (e.g., an orientation, position, and/or path of motion) of the magnet(s) of the human interface device with respect to the sensing system. These properties may be sensed by (i) obtaining measurements of the magnetic field emanating from the magnet(s), and (ii) computing the position, orientation, and/or path of motion based on the measurements.

As mentioned with regard to FIG. 1, it will be appreciated that the sensing system may track and provide information regarding any number of human interface devices without departing from embodiments disclosed herein.

Additionally, it will be appreciated that the human interface device may be actuated any number of times, in any number of ways, and/or for any duration of time. This duration, number (frequency), and/or a speed of the actuation (determined by the duration of time) of the human interface device may be used to determine a type of the user input.

At operation 304, pattern matching of the sensor data is performed against a generalized set of sensor data patterns that are location dependent to obtain a type of the user input, the type of the user input corresponding with an operation performable by a data processing system (refer back to the description of FIGS. 2A and 2D-2E for clarifying information regarding the location dependency of the sensor data patterns).

The pattern matching may be performed by (i) identifying a location at which the sensor data indicates an actuation of the human interface device is performed, (ii) based on the location, identifying a portion of the generalized set that corresponds with types of user input for the identified location, and (iii) comparing the sensor data to sensor data patterns of the identified portion to obtain a matched sensor data pattern. Once a sensor data pattern is found to match the sensor data, the associated type of user input may be identified.

Hence, each sensor data pattern in the generalized set may be associated with a type of user input that corresponds with a respective location of the sensing system. Furthermore, these sensor data patterns may be obtained (and therefore, placed in the generalized set once obtained) by monitoring past positions, orientations, and/or paths of motion of magnet(s) of the human interface device (and/or other magnets similar to the magnet).

At operation 306, an operation to be performed is identified based on the type of user input. The operation may be identified by providing the user input to an application or other entity that consumes the type of the user input. For example, the application may use the type of the user input to identify a function to be performed.

The operation may also be identified by, for example, using the position of the human interface device to identify a change in focus of the user (e.g., a cursor location on a display). The combination of the focus of the user and the user input (e.g., based on the user clicking an actuatable portion of a human interface device) may then be used to identify, for example, a function of the application or other type of functionality to be initiated or otherwise performed.

At operation 308, the operation is performed. The operation may be performed by, for example, initiating performed by an operating system application, or other type of consumer of the user input. The consumer may then take action (e.g., provide computer-implemented services) based on the operation.

For example, the type of the user input may be one of multiple types conveyed using the human input device. When received, the focus of the system in combination with the user input may indicate the operation to be performed. The operation may then be performed by the system.

The method may end following operation 316.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits. By integrating multiple sensing arrays with a sensing system, multiple human interface devices may be used by a user to provide user input to a data processing system.

Figure 4:
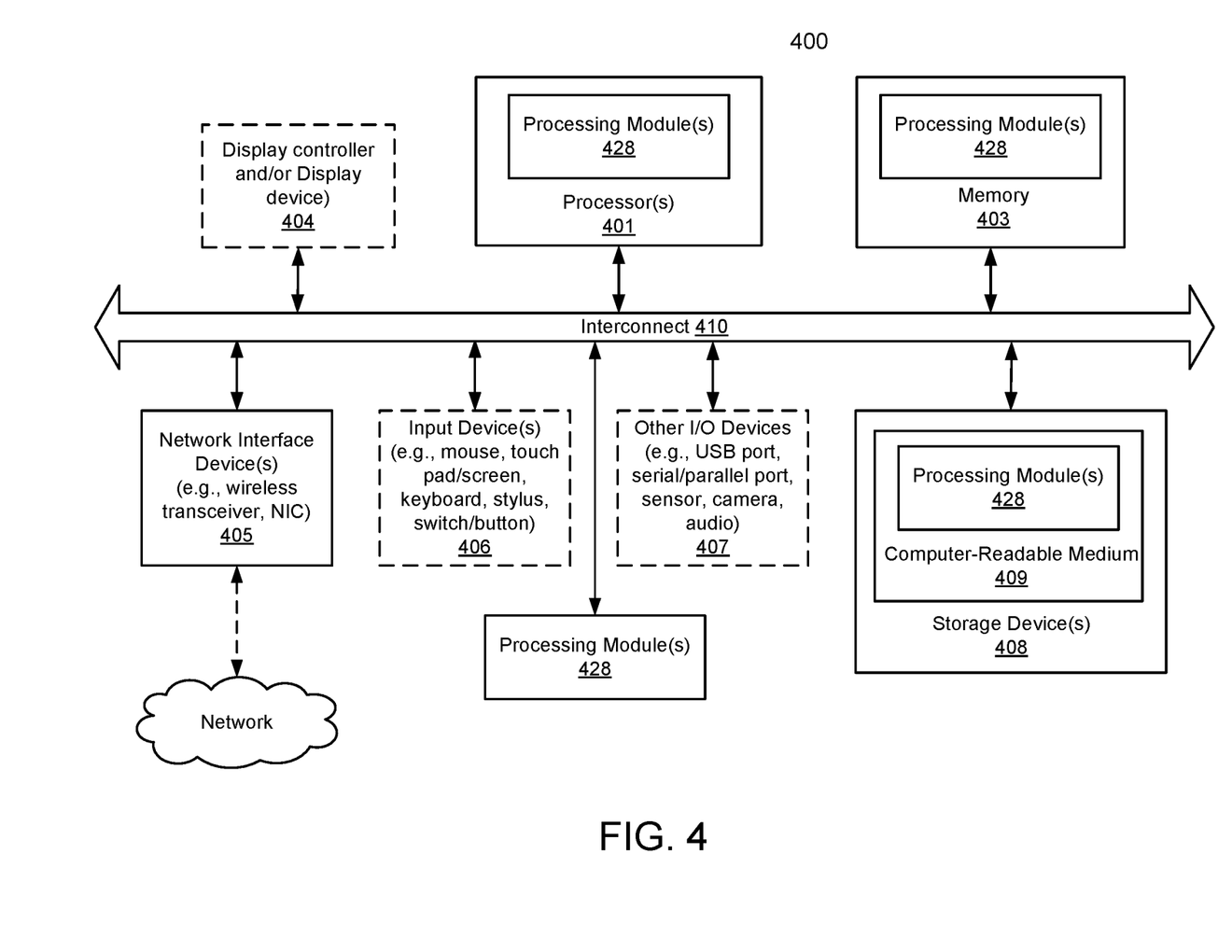
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions.

The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for interpreting user input provided by a human interface device, the method comprising:
    identifying a presence of the human interface device;
    obtaining, based on the identified presence, sensor data from a sensing system that tracks a magnetic field emanating from the human interface device;
    performing pattern matching of the sensor data against a generalized set of sensor data patterns that are location dependent to obtain a type of the user input, the type of the user input corresponding with an operation performable by a data processing system;
    identifying the operation to be performed based on the type of the user input; and
    performing the operation.

2. The method of claim 1, wherein identifying the presence of the human interface device comprises:
    identifying a sensing element from which the sensor data is obtained; and
    identifying a sensing area associated with the sensing element.

3. The method of claim 2, wherein the sensing area comprises at least two zones, and each of the at least two zones comprises respective portions of the sensing area.

4. The method of claim 3, wherein performing the pattern matching comprises:
    identifying, based on the sensor data, a zone of the at least two zones in which the human interface device is positioned;
    identifying a sub-set of the generalized set of sensor data patterns associated with the zone;
    discriminating one of the sensor data patterns of the sub-set of the generalized set of sensor data patterns based on the sensor data; and
    using the discriminated one of the sensor data patterns of the sub-set of the generalized set of sensor data patterns to obtain the type of the user input.

5. The method of claim 1, wherein a first sensor data pattern of the generalized set of sensor data patterns is associated with a first zone and a second zone, a first pair of the first sensor data pattern and the first zone is associated with a first type of user input, and a second pair of the first sensor data pattern and the second zone is associated with a second type of user input.

6. The method of claim 5, wherein the sensing system comprises:
    a first sensing area comprising the first zone and the second zone; and
    a second sensing area separate from the first sensing area.

7. The method of claim 6, wherein the sensing system further comprises:
- first sensing elements positioned with the first area to monitor human interface devices positioned proximate to the first area; and
- second sensing elements positioned with the second area to monitor human interface devices positioned proximate to the first area.

8. The method of claim 6, wherein the sensing system further comprises:
- a structural feature that delineates the first zone from other zones in the first sensing area.

9. The method of claim 8, wherein the structural feature comprises a recess in a surface of the sensing system in the first sensing area.

10. The method of claim 6, wherein the sensing system further comprises:
- a graphical display element positioned in the second sensing area, the graphical display element being positioned straddling across at least two zones of the second sensing area, and each of the at least two zones of the second sensing area being associated with different types of user input.

11. The method of claim 10, wherein the graphical display element comprises a video display adapted to operably connect to the data processing system that performs the operation.

12. A non-transitory machine-readable medium having instructions stored therein, which when executed by a processor, cause the processor to perform operations for interpreting user input provided by a human interface device, the operations comprising:
- identifying a presence of the human interface device;
- obtaining, based on the identified presence, sensor data from a sensing system that tracks a magnetic field emanating from the human interface device;
- performing pattern matching of the sensor data against a generalized set of sensor data patterns that are location dependent to obtain a type of the user input, the type of the user input corresponding with an operation performable by a data processing system;
- identifying the operation to be performed based on the type of the user input; and
- performing the operation.

13. The non-transitory machine-readable medium of claim 12, wherein identifying the presence of the human interface device comprises:
- identifying a sensing element from which the sensor data is obtained; and
- identifying a sensing area associated with the sensing element.

14. The non-transitory machine-readable medium of claim 13, wherein the sensing area comprises at least two zones, and each of the at least two zones comprises respective portions of the sensing area.

15. The non-transitory machine-readable medium of claim 14, wherein performing the pattern matching comprises:
- identifying, based on the sensor data, a zone of the at least two zones in which the human interface device is positioned;
- identifying a sub-set of the generalized set of sensor data patterns associated with the zone;
- discriminating one of the sensor data patterns of the sub-set of the generalized set of sensor data patterns based on the sensor data; and
- using the discriminated one of the sensor data patterns of the sub-set of the generalized set of sensor data patterns to obtain the type of the user input.

16. The non-transitory machine-readable medium of claim 12, wherein a first sensor data pattern of the generalized set of sensor data patterns is associated with a first zone and a second zone, a first pair of the first sensor data pattern and the first zone is associated with a first type of user input, and a second pair of the first sensor data pattern and the second zone is associated with a second type of user input.

17. A data processing system, comprising:
- a processor; and
- a memory coupled to the processor to store instructions, which when executed by the processor, cause the processor to perform operations for interpreting user input provided by a human interface device, the operations comprising:
  - identifying a presence of the human interface device;
  - obtaining, based on the identified presence, sensor data from a sensing system that tracks a magnetic field emanating from the human interface device;
  - performing pattern matching of the sensor data against a generalized set of sensor data patterns that are location dependent to obtain a type of the user input, the type of the user input corresponding with an operation performable by a data processing system;
  - identifying the operation to be performed based on the type of the user input; and
  - performing the operation.

18. The data processing system of claim 17, wherein identifying the presence of the human interface device comprises:
- identifying a sensing element from which the sensor data is obtained; and
- identifying a sensing area associated with the sensing element.

19. The data processing system of claim 18, wherein the sensing area comprises at least two zones, and each of the at least two zones comprises respective portions of the sensing area.

20. The data processing system of claim 19, wherein performing the pattern matching comprises:
- identifying, based on the sensor data, a zone of the at least two zones in which the human interface device is positioned;
- identifying a sub-set of the generalized set of sensor data patterns associated with the zone;
- discriminating one of the sensor data patterns of the sub-set of the generalized set of sensor data patterns based on the sensor data; and
- using the discriminated one of the sensor data patterns of the sub-set of the generalized set of sensor data patterns to obtain the type of the user input.

* * * * *